United States Patent [19]
Cirulis

[11] 3,720,105
[45] March 13, 1973

[54] ACOUSTIC FLOWMETER
[75] Inventor: Uldis Cirulis, Midland Park, N.J.
[73] Assignee: NU Sonics, Inc., Paramus, N.J.
[22] Filed: March 24, 1971
[21] Appl. No.: 127,551

[52] U.S. Cl. .............................................73/194 A
[51] Int. Cl. ..............................................G01f 1/00
[58] Field of Search....................................73/194 A

[56] References Cited

UNITED STATES PATENTS

| | | | |
|---|---|---|---|
| 2,921,467 | 1/1960 | Hedrich et al. | 73/194 A |
| 2,949,773 | 8/1960 | Batchelder | 73/194 A |
| 3,007,339 | 11/1961 | Hill | 73/194 A |
| 3,420,102 | 1/1969 | Brown | 73/194 A |
| 2,912,856 | 11/1959 | Kritz | 73/194 A |
| 3,605,504 | 9/1971 | Kummer, Jr. et al. | 73/67.7 |
| 3,237,453 | 3/1966 | Yamamoto et al. | 73/194 A |
| 3,329,017 | 7/1967 | Yamamoto et al. | 73/194 A |

*Primary Examiner*—Charles A. Ruehl
*Attorney*—Samuelson & Jacob

[57] ABSTRACT

An acoustic flowmeter for measuring the flow of fluid in a pipe having a pair of transducers mounted on the pipe opposite each other with one downstream from the other, an oscillator associated with each transducer, the transducers sharing time so that each is used in the transmit mode and the receive mode to use the same acoustic path and thereby eliminate the variables due to the use of different paths, means for controlling the amplitude of the excitation applied to the transmit mode transducer and means for controlling the frequency of the oscillators, and means for obtaining the difference between the two oscillator frequencies which frequency is a function of the velocity of flow of the fluid in the pipe.

6 Claims, 4 Drawing Figures

INVENTOR.
ULDIS CIRULIS
BY
Samuelson & Jacob
ATTORNEYS

ACOUSTIC FLOWMETER

The invention relates to acoustic flowmeters used for measuring the velocity of a fluid flowing in a pipe.

In particular, the invention is directed toward providing an acoustic (sonic) flowmeter utilizing two transducers which are used to transmit and receive the sonic pulses traversing the fluid on a shared basis. In this configuration, the upstream and the downstream transmissions share the same path and have the same sonic path length. It is thus possible to eliminate the errors in measurement which are a function of differences in sonic path length. Accuracy of the measurement of the fluid flow velocity, which is a function of the difference in the upstream and the downstream pulse repetition frequencies, can thereby be improved by this construction.

Prior art techniques and constructions have attempted various solutions to the path length problem. One such system utilized a pair of transducers, mounted close together on the pipe, and a second pair of similar transducers mounted across the pipe and downstream from the first pair. One of the transducers of each pair served as a transmitting transducer and transmitted sonic pulses across the fluid to the receiving transducer of the oppositely mounted pair. While the upstream and the downstream sonic paths of such a system are almost equal, they are not identical and the inequality introduces errors in the flow velocity measurements.

It is an important object of the invention to provide an acoustic (sonic) flowmeter which utilizes a pair of oppositely mounted transducers, one downstream from the other, which selectively transmit sonic pulses across the fluid, to obtain a determination of the fluid flow velocity from a measurement of the difference in the downstream and upstream pulse repetition frequencies.

It is a further object of the invention to provide such a flowmeter wherein there is an electronic amplitude servo system for limiting the amplitude of the excitation applied to the transducer in the transmit mode. The amplitude of the excitation applied to the transducer in the transmit mode is adjusted so that the amplitude of the signal received by the transducer in the receive mode is constant for all conditions of sound attenuation in the fluid medium.

It is a still further object of the invention to provide such a flowmeter wherein there is an electronic frequency servo system for controlling the frequency of the excitation oscillators.

It is a still further object of the invention to provide such a flowmeter wherein critical elements of the system are common to both the downstream and upstream transmissions to thereby eliminate errors due to inherent differences in dual elements, no matter how well matched they may be.

These and other objects, advantages, features and uses will be apparent during the course of the following description when taken in conjunction with the accompanying drawings, wherein.

Figure 1:
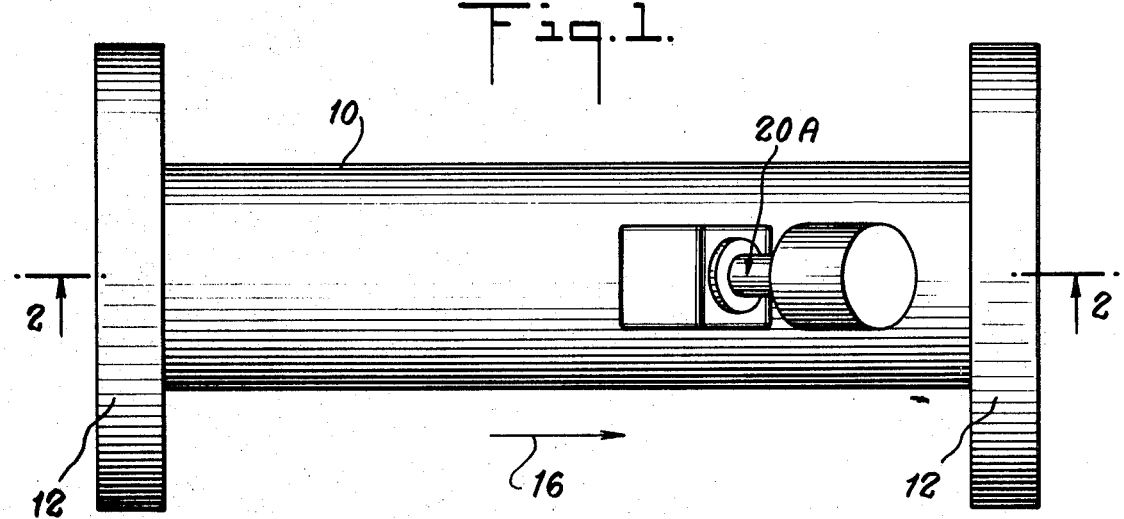
FIG. 1 is a plan view of a transducer pipe section which is a part of the flowmeter of the invention.
Figure 2:
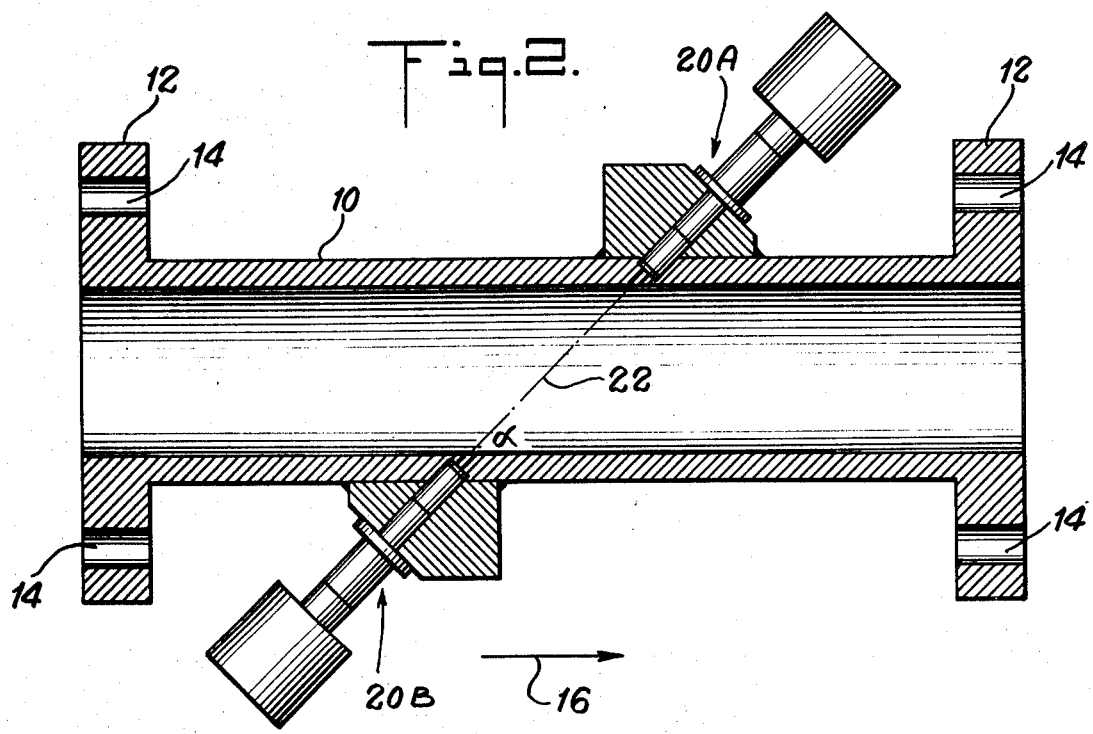
FIG. 2 is a sectional view taken on the lines 2—2 of FIG. 1, viewed in the direction of the arrows.

In the drawings, wherein, for the purpose of illustration, and wherein like numerals are employed to designate like parts throughout the same, the numeral 10 designates a pipe section which is inserted in a pipe system whose fluid flow is to be measured. Pipe section 10 is affixed in the flow by means, for example, of bolts and nuts inserted in openings 14 of flanges 12 which cooperate with similar flanges on the adjacent pipe sections.

For the purpose of illustration, it is assumed that the fluid flow is in the direction of arrow 16 so that transducer 20A is the downstream transducer which transmits upstream and transducer 20B is the upstream transducer which transmits downstream.

Numeral 22 is used to designate the acoustic (sonic) path between the faces of the two transducers and its length is designated as L. The acute angle made by path 22 with the wall of the pipe is designated as $\alpha$.

The flowmeter of the invention comprises a pair of velocimeters which are locked by time comparison techniques as will appear later in this description. The transducers share time on the acoustic path so that for part of the time transducer 20A is in the transmit mode and transducer 20B is in the receive mode and for another part of the time transducer 20B is in the transmit mode and transducer 20A is in the receive mode.

The relationship between the fluid flow velocity and the pulse repetition frequency is given as follows:

Upstream: $f_A = N(c - v\cos\alpha)/L$
Downstream: $f_B = N(c + v\cos\alpha)/L$ where:
$c$ = velocity of sound in the fluid
$v$ = velocity of fluid flow
$L$ = sonic path length
$\alpha$ = angle between the sonic path length and the pipe wall
$N$ = frequency divider ratio of the phase-locked loop Now, $\Delta f = f_B - f_A = (2Nv \cos\alpha)/L$ and the fluid flow velocity, $$V = \Delta f L / 2N \cos\alpha$$

Thus, it can be seen that the fluid flow velocity is a function of the frequency difference and can be determined from a measurement of $\Delta f$.

The designation AE is used to signify the enabling of the circuits associated with transducer 20A to put it in the transmit mode and the designation BE is used in the same sense with respect to transducer 20B.

Figure 3:
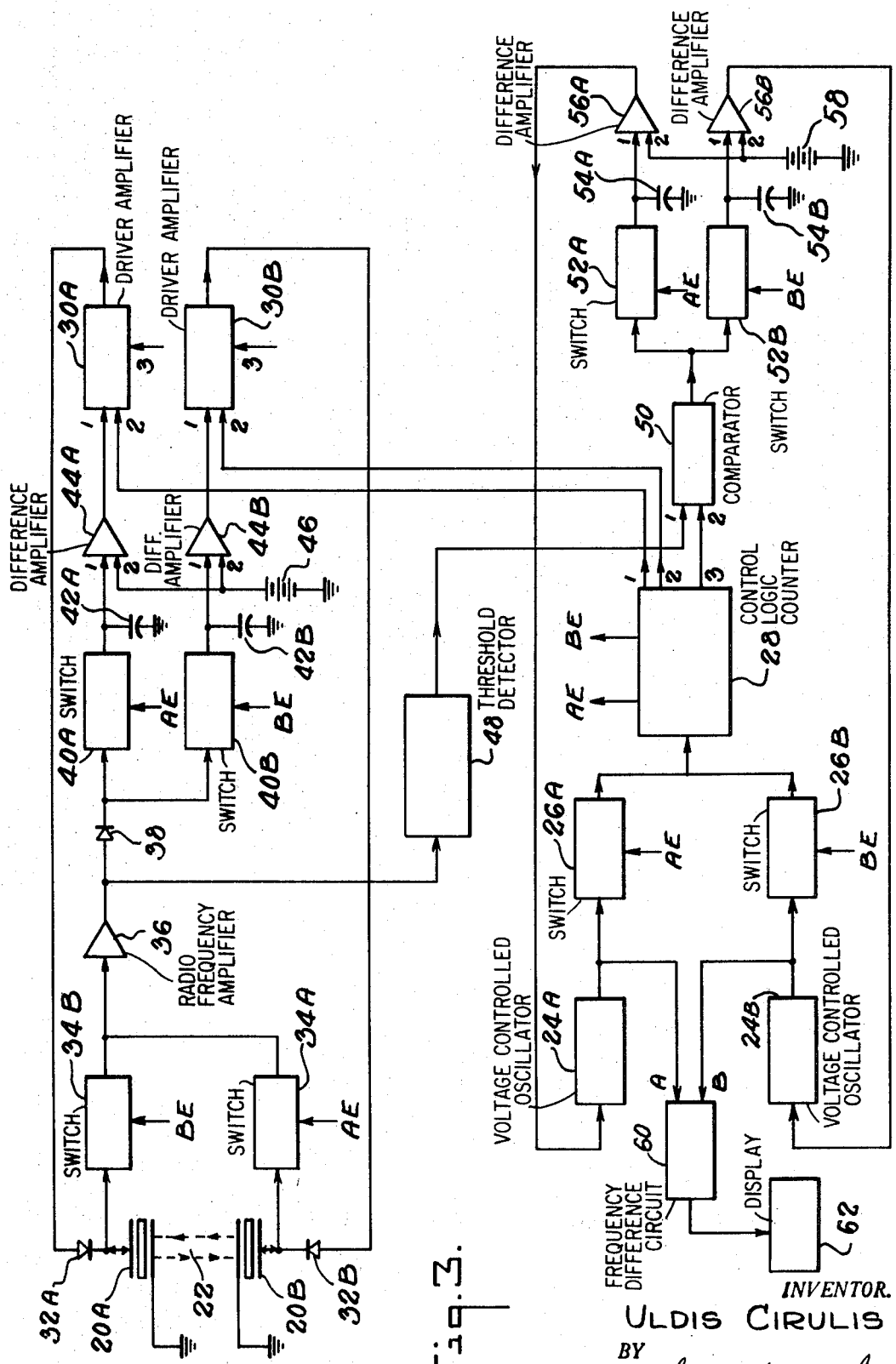
FIG. 3 is a block diagram of the acoustic (sonic) flowmeter of the invention.

Considering the circuit of FIG. 3, and assuming that the AE circuits are on so that transducer 20A has excitation applied to it from voltage controlled oscillator 24A through switch 26A, control logic counter 28 to input 2 of driver amplifier 30A and decoupling means preferably diode 32A.

Switch 26A is preferably a logic gate which is "on" when AE is "on" and is "off" where there is no AE signal present.

The excitation signal is changed by transducer 20A to an acoustic signal which is transmitted across the pipe along path 22 and is received by transducer 20B. Transducer 20B converts the acoustic signal into an electrical signal which is blocked by diode 32B so that the signal goes through switch 34A, which is preferably a field effect transistor which is "on" when AE is "on" and is "off" when there is no AE signal present. The signal then is applied to the input of radio frequency amplifier 36. The output of radio frequency amplifier 36 is connected to peak detector diode 38 which is, in turn, connected to switch 40A. Switch 40A is similar to switch 34A.

The output of switch 40A is connected to capacitor 42A and to input 1 of difference amplifier 44A. The charge on capacitor 42A is proportional to the amplitude of the received pulse received by transducer 20B and serves to vary and control the amplitude of the excitation pulse. This is accomplished by comparing the voltage on input 1 of difference amplifier 44A with the reference voltage applied to input 2 from source 46.

The output of difference amplifier 44A is applied to input 1 of driver amplifier 30A and serves to raise or lower the output excitation signal, as required. Input 3 of driver amplifier 30A is used to obtain adjustable delay.

Input 3 is a manual adjustment to equalize the delays in the A and B channels. The delay adjustment consists of adjusting a small trimmer capacitor. The delay introduced is a function of the size of this trimmer capacitor.

The loop just described can be designated an electronic amplitude servo circuit since it serves to control the amplitude of the excitation signal applied to the transducer. Thus, it can be seen that the amplitude may be changed to accommodate changes in the acoustic attenuation in the path which is encountered, for example, with a change in the fluid flowing in the pipe.

The output of radio frequency amplifier 36 is also connected to the input of a threshold detector 48 which passes signals above a certain predetermined value to input 1 of comparator 50. A signal from output 3 of control logic counter 28 is applied to input 2 of comparator 50. The signal output of comparator 50 flows through switch 52A, which is similar to switches 34A and 40A, to input 1 of difference amplifier 56A and to capacitor 54A. The charge on capacitor 54A is proportional to the pulse repetition frequency.

The signal on input 1 of difference amplifier 56A is compared with that from reference voltage source 58 which is applied to input 2. The output of difference amplifier 56A is connected to voltage controlled oscillator 24A and increases the frequency if the output voltage is positive and decreases it if it is negative. This is then an electronic frequency servo as it serves to control the excitation pulse repetition frequency.

Control logic counter 28 turns off circuit AE and turns on circuit BE so that transducer 20B now transmits downstream to transducer 20A. The operation just described for condition AE now takes place for condition BE utilizing all the elements designated with the suffix B and those elements which are common to both systems A and B. The critical components are common to both modes so that there is a minimum of error due to the mismatching of these components which would probably occur if two such elements were used (one in each system). The common components are radio frequency amplifier 36, peak detector diode 38, threshold detector 48, control logic counter 28 and comparator 50.

The outputs of voltage controlled oscillators 24A and 24B, whose frequency outputs are proportional to voltage, are fed to frequency difference circuit 60 which produces frequency $f$ which is a parameter from which the flow velocity may be derived.

The output of circuit 60 may be displayed on a display 62 such as a counter indicating flow velocity or a totalizing counter may be used to produce a mass flow display.

Figure 4:
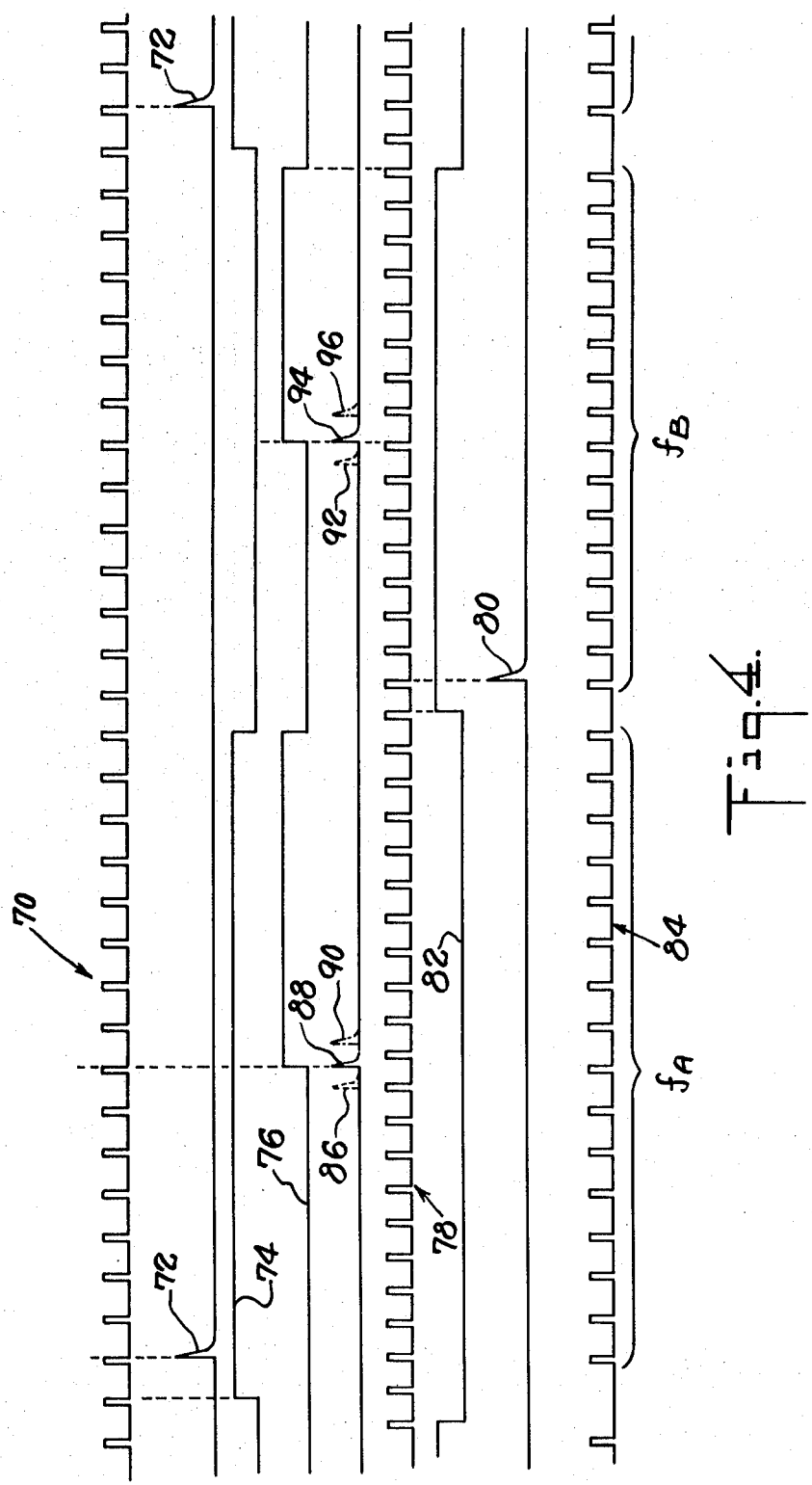
FIG. 4 is a timing diagram of the system of FIG. 3.

The operation of the flowmeter of the invention will best be understood by an examination of FIG. 4. Curve 70 represents the pulse train which is transmitted by voltage controlled oscillator 24A. Pulses 72 are the pulses which are applied to transducer 20A to produce an acoustic pulse which is transmitted upstream across the fluid flow.

Curve 74 represents the AE (A enable) "on" condition when positive and the "off" condition when zero. Curve 76 is the representation of the comparator reference signal. Curve 78 represents the pulse train which is transmitted by voltage controlled oscillator 24B and pulses 80 are those which are applied to transducer 20B to produce an acoustic pulse which is transmitted downstream across the fluid flow.

Curve 82 represents the BE (B enable) "on" condition when positive and the "off" condition when zero. Curve 84 represents the combined pulse trains from oscillators 24A and 24B, those from oscillator 24A are designated $f_A$ and appear when AE is on and those from oscillator 24B are designated $f_B$ and appear when BE is on.

Pulses 86, 88 and 90 represent the three possible positions at which an acoustic pulse transmitted by transducer 20A may appear at the output of the threshold detector 48. Pulses 92, 94 and 96 represent the three possible positions at which an acoustic pulse transmitted by transducer 20B may appear at the output of the threshold detector 48.

Pulses 88 and 94 have arrived at the correct time, namely at the positive-going edge of the comparator reference curve 76. In these conditions, no frequency corrections are made. Pulses 86 and 92 arrive too early. Under these conditions, the associated oscillator frequency is increased. Pulses 90 and 96 arrive too late and under these conditions, the associated oscillator frequency is decreased.

Operation proceeds as follows:

1. AE on
2. Pulse 72 is applied to transducer 20A and an acoustic pulse is transmitted across the fluid.
   3a. Pulse 88 received — no frequency correction. or
   3b. Pulse 86 received — frequency of oscillator 24A is increased, or
   3c. Pulse 90 received — frequency of oscillator 24A is decreased.
4. At some subsequent time AE is turned off by control logic counter 28.
5. BE on
6. Pulse 80 is applied to transducer 20B and an acoustic pulse is transmitted across the fluid.
   7a. Pulse 94 received — no frequency correction. or
   7b. Pulse 92 received — frequency of oscillator 24B is increased. or
   7c. Pulse 96 received — frequency of oscillator 24B is decreased.
8. The signal represented by curve 84 containing $f_A$ during AE on and $f_B$ during Be on is used as input to the control logic counter 28. The signals represented by curves 70 and 78 ($f_A$ and $f_B$ respectively) are applied to a frequency difference circuit whose output is utilized to display flow velocity or mass flow depending upon the display device used.

While a particular embodiment of the invention has been shown and described, it is apparent to those skilled in the art that modifications are possible without departing from the spirit of the invention or the scope of the subjoined claims.

The embodiments of the invention in which an exclusive property or privilege is claimed are defined as follows:

1. In a system for measuring the flow of fluid in a pipe wherein a pair of transducers is mounted on the pipe opposite each other and wherein one of the transducers is downstream from the other and wherein there is a pair of oscillators for exciting the transducers, there being one such oscillator associated with each transducer, the improvement comprising:

means for selecting one of the oscillators to thereby excite one of the transducers such that only one of them is excited at any given time in the transmit mode such that an acoustic wave is transmitted across the pipe and is received by the other transducer in the receive mode and such that each of the transducers is alternatively in the transmit mode and the receive mode;

amplitude servo means connected to the transducers such that its input is connected to the receive mode transducer and its output is connected to the transmit mode transducer such that the amplitude of the signal received by the receive mode transducer is maintained constant;

frequency servo means having its input connected to the receive mode transducer and its output connected to the oscillator associated with the transmit mode transducer such that the frequency of the said oscillator is maintained within predetermined limits; and means for obtaining the difference between the frequencies of the two oscillators, which difference frequency is a function of the flow velocity of the fluid in the pipe.

2. The invention of claim 1 wherein the amplitude servo means comprises:

a single radio frequency amplifier, having an input and an output, whose input is connected to either of the transducers whichever is in the receive mode;

a pair of difference amplifiers, each having at least two inputs and an output there being one such difference amplifier associated with each transducer in the transmit mode;

a pair of driver amplifiers, there being one such driver amplifier associated with each transducer in the transmit mode, each such driver amplifier having at least two inputs and an output;

the output of the radio frequency amplifier being selectively connected to one of the inputs of the difference amplifier associated with the transducer in the transmit mode;

a reference voltage directly connected to the other input of both difference amplifiers;

the output of each difference amplifier being connected to one of the inputs of its associated driver amplifier;

the other input of each driver amplifier receiving excitation from its associated oscillator when its associated transducer is in the transmit mode.

3. The invention of claim 2 including a peak detector diode connected between the output of the radio frequency amplifier and the inputs to the difference amplifiers.

4. The invention of claim 3 wherein the frequency servo means comprises:

a control logic counter having an input and a plurality of outputs;

the input of the control logic counter being selectively connected to the output of the oscillator in the transmit mode;

a threshold detector having an input and an output, its input being connected to the output of the radio frequency amplifier;

a comparator having at least two inputs and an output;

an output of the control logic counter being connected to an input of one of the driver amplifiers such that signal is transmitted to the driver amplifier when its associated elements are in the transmit mode;

an output of the control logic counter being connected to an input of the comparator and the output of the threshold detector being connected to a second input of the comparator such that the signals therefrom are compared to produce a difference therebetween at the output of the comparator;

a second pair of difference amplifiers, there being one such amplifier associated with each transducer, each of said amplifiers having two inputs and an output;

the output of the comparator being selectively connected to one of the inputs of one of the pair of the second pair of difference amplifiers whose associated transducer is in the transmit mode;

a reference voltage connected to the other input of each of the second pair of difference amplifiers so that the difference amplifier develops a difference signal between the signal from the comparator and the reference voltage;

the output of the said difference amplifier being connected to its associated oscillator so that the frequency is adjusted in a predetermined direction depending upon the sign and amplitude of the difference signal.

5. The invention of claim 2 wherein the frequency servo means comprises:

a control logic counter having an input and a plurality of outputs;

the input of the control logic counter being selectively connected to the output of the oscillator in the transmit mode;

a threshold detector having an input and an output, its input being connected to the output of the radio frequency amplifier;

a comparator having at least two inputs and an output;

an output of the control logic counter being connected to an input of one of the driver amplifiers such that signal is transmitted to the driver amplifier when its associated elements are in the transmit mode;

an output of the control logic counter being connected to an input of the comparator and the output of the threshold detector being connected to a second input of the comparator such that the signals therefrom are compared to produce a difference therebetween at the output of the comparator;

a second pair of difference amplifiers, there being one such amplifier associated with each transducer, each of said amplifiers having two inputs and an output;

the output of the comparator being selectively connected to one of the inputs of one of the pair of the second pair of difference amplifier whose associated transducer is in the transmit mode;

a reference voltage connected to the other input of each of the second pair of difference amplifiers so that the difference amplifier develops a difference signal between the signal from the comparator and the reference voltage;

the output of the said difference amplifier being connected to its associated oscillator so that the frequency is adjusted in a predetermined direction depending upon the sign and amplitude of the difference signal.

6. The invention of claim 1 wherein the frequency servo means comprises:

a threshold detector having an input and an output with its input receiving a signal from the receive mode transducer;

a control logic counter having an input and a plurality of outputs;

the input of the control logic counter being selectively connected to the output of the oscillator in the transmit mode;

a comparator having at least two inputs and an output;

an output of the control logic counter being connected such that signal is transmitted to the transducer which is in the transmit mode;

an output of the control logic counter being connected to an input of the comparator and the output of the threshold detector being connected to a second input of the comparator such that the signals therefrom are compared to produce a difference therebetween at the output of the comparator;

a pair of difference amplifiers, there being one such amplifier associated with each transducer, each of said amplifiers having two inputs and an output;

the output of the comparator being selectively connected to one of the inputs of the difference amplifier whose associated transducer is in the transmit mode;

a reference voltage connected to the other input of each of the difference amplifiers so that the difference amplifier develops a difference signal between the signal from the comparator and the reference voltage;

the output of the difference amplifier being connected to its associated oscillator so that the frequency is adjusted in a predetermined direction depending upon the sign and amplitude of the difference signal.

* * * * *